Oct. 14, 1952     A. WRIGHT     2,614,224
RADIOGRAPHIC EQUIPMENT
Filed May 25, 1948     3 Sheets—Sheet 1
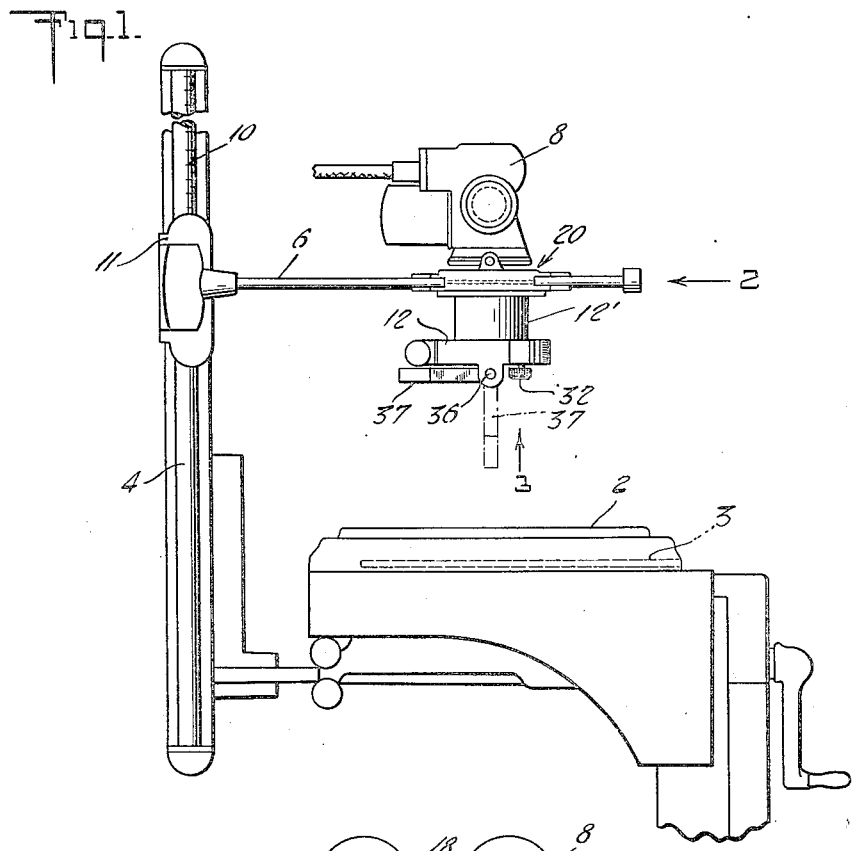
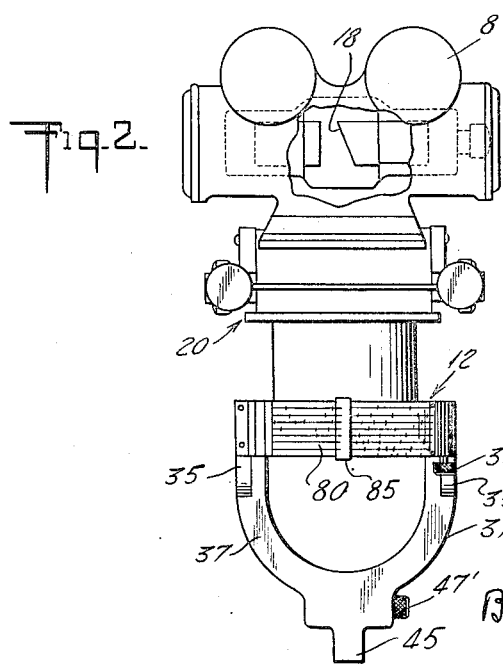
INVENTOR
ARTHUR WRIGHT
BY
Bartlett Eyre Keel & Weymouth
ATTORNEYS Oct. 14, 1952        A. WRIGHT        2,614,224
RADIOGRAPHIC EQUIPMENT
Filed May 25, 1948        3 Sheets-Sheet 2
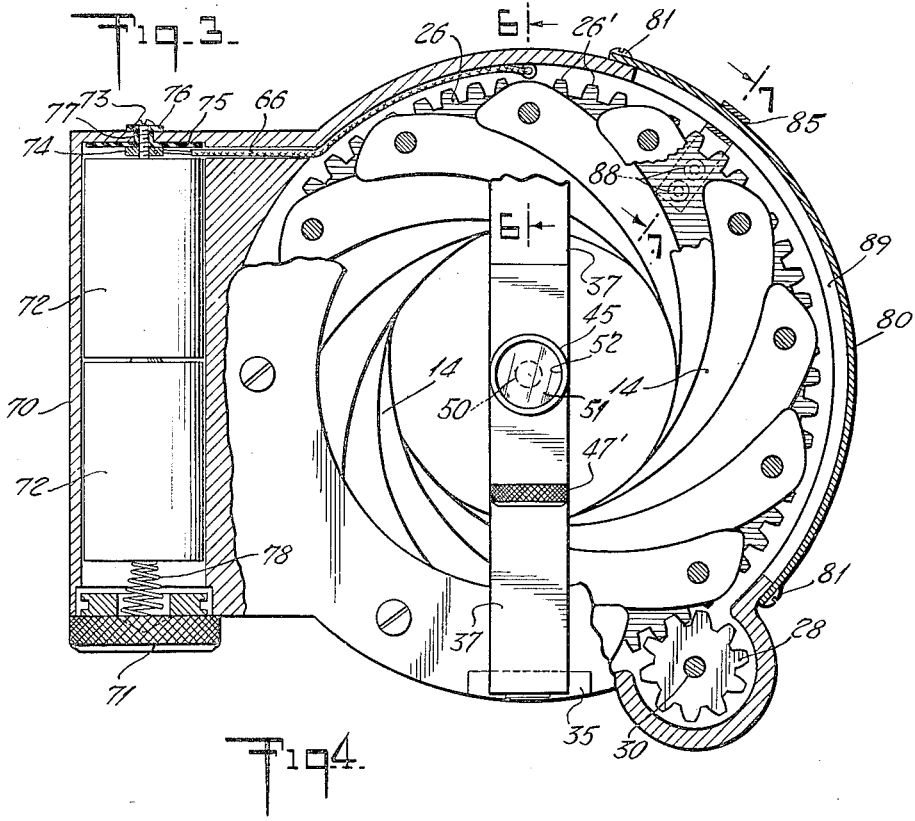
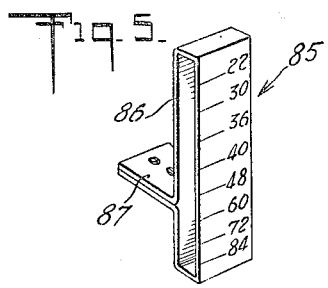
INVENTOR
ARTHUR WRIGHT
ATTORNEYS

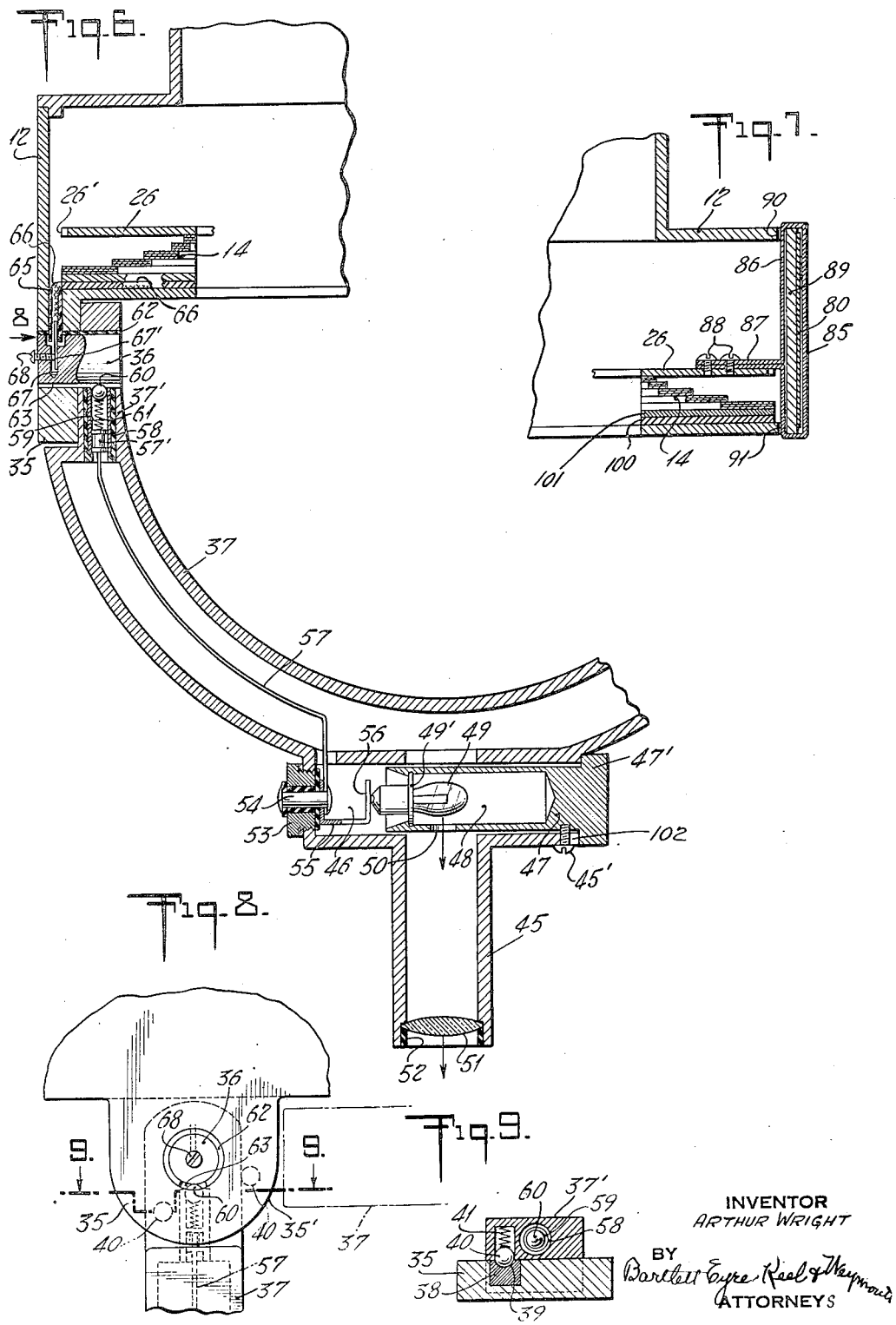

Patented Oct. 14, 1952

2,614,224

UNITED STATES PATENT OFFICE 2,614,224

RADIOGRAPHIC EQUIPMENT

Arthur Wright, Mountain Lakes, N. J., assignor to Wright Engineering Company, Mountain Lakes, N. J., a corporation of New Jersey Application May 25, 1948, Serial No. 29,087

3 Claims. (Cl. 250—64)

This invention relates to radiographic equipment and particularly to X-ray apparatus for diagnostic photography.

More particularly this invention relates to radiographic equipment of the general character disclosed in United States Patent 2,295,975 issued September 15, 1942 and embodies improvements over the radiographic equipment therein disclosed.

One object of the invention is a novel and improved means for facilitating the centering and positioning of the subject with respect to the target and the film.

A further object of the invention is a novel and improved scale mount and means for the equipment.

Further objects of the invention will hereinafter appear.

For a better understanding of the invention reference may be had to the accompanying drawings wherein Fig. 1 is a side view of an X-ray apparatus embodying the invention;

Fig. 2 is a view of a part thereof looking in the direction of the arrow 2 of Fig. 1;

Fig. 3 is a bottom view of the focusing unit, partly broken away;

Fig. 4 is an enlarged view of the scale and index used for determining the area of exposure;

Fig. 5 is a perspective view of one of the scale elements;

Fig. 6 is an enlarged view of a part of the focusing and centering unit shown in section;

Fig. 7 is an enlarged sectional view through the scale and scale mount;

Fig. 8 is a view of one side of the centering means looking in the direction of the arrow 8 in Fig. 6; and Fig. 9 is a section along the line 9—9 of Fig. 8.

Referring to the drawings, I have illustrated my invention as applied to an X-ray apparatus generally of conventional character including a table 2, an upright 4 and a vertically adjustable cross arm or cross arms 6 and an X-ray tube housing 8. The table 2 is provided with a suitable recess for the reception of a sensitized plate or film 3 as, for example, being provided with a slot or the like for the reception of the film 3. A scale 10 provided on the upper portion of the upright 4 gives, in conjunction with an indicator on a support 11 for the supporting arm 6, the vertical distance between the target and the film, the target being schematically illustrated at 18. The supporting arm or arms 6 are trunnioned at their inner ends in the support 11 for movement in horizontal planes.

In addition to the X-ray tube 9 and target 18, etc. the supporting arms 6 carry a shallow cylindrical housing 12 therebeneath and in line with the target 18 of the X-ray tube. In the particular embodiment shown the housing 12 is spaced from the arms 6 by a hollow, square adapter-member or casing 12' which is of smaller lateral dimensions than that of the housing 12 and is integrally formed therewith. The member 12' is suitably fastened to the underside of the base support 20 for the X-ray tube 8 and the base 20 is apertured to form a continuation of the hollow casing member.

The housing 12 contains any suitable diaphragm for varying the opening therethrough. In the particular embodiment shown the housing contains a conventional iris diaphragm 14 but it is understood that any other suitable aperture control may be used. The diaphragm aperture or opening is controlled by a ring 26 having a portion of the outer edge thereof formed into gear teeth 26'. A gear 28 is mounted in the casing and meshes with the gear teeth 26', the gear being mounted on the shaft 30 having a knurled knob 32 for operating the ring 26 and therefore the diaphragm for controlling the diaphragm aperture. The diaphragm elements, namely the sheets or leaves of the iris diaphragm, are preferably of lead or other material impervious to X-rays.

The cylindrical casing 12 is provided at diametrically opposite points thereof with downwardly depending supports 35 carrying trunnion pins 36 for the ends of a bail-like light bracket member 37. The latter is provided with openings at its upper ends for receiving the trunnion pins 36. The outer sides of the ends of the bail-like member 37 are milled off to a depth approaching the thickness of the supporting parts 35. The latter are rounded off at their lower edges as shown in the drawing at 35' to form cylindrical surfaces having radii to the center of the trunnion pins 36, thereby permitting the free swinging of the bail-like member 37 from a downwardly extending position to the horizontal position or vice versa. Each of the supports 35 is provided with a pair of hardened steel inserts 38 with their inner ends flush with the surfaces of the milled off sides of the ends of the bail-like member 37. Each insert is provided with a locking recess 39 which is engaged by a ball 40 mounted in a recess formed in an end 37' of the bail-like member and containing a biasing spring 41. The hardened steel inserts 38 are disposed 90° from each other and are adapted to lock the light frame either in the downwardly extended position or in the horizontal position. Both ends 37' of the bail member 37 are provided with locking means 38, 39, 40.

This forms a shiftable centering light bracket. The member 37 is hollow and is provided with a T extension comprising a tube 45 extending generally centrally of the structure and a chamber 46 at right angles thereto. A lamp holder 47 extends into the chamber 46 from one end thereof, the holder having an enlarged end 47'. The holder 47 itself is formed with a chamber 48 and an incandescent lamp 49 is mounted therein as by means of a disc support 49' suitably fastened to the interior of the holder 47. This lamp 49 is preferably prefocused and is mounted so as to have the filament of the lamp centrally alined with the tubular part 45 with an opening 50 in one side of the hollow holder 47 and in line with the filament of the lamp 49. The holder 47 with the lamp 49 therein is inserted through the open end of the chamber 46 and is anchored in position in any suitable manner as, for example, by a set screw 45' screw-threadedly attached to the holder 47 and adapted to occupy the bayonet slot 102 formed in the wall of the chamber 46.

A lens 51 is carried near the outer end of the tubular extension 45 and this lens is held in position by a holding ring 52. A nut 53 is screw-threadedly attached in the opposite end of the chamber 46 for carrying the lamp terminal. This nut is of insulating material as, for example, fibre and is provided with an opening for the reception of a pivot or pin 54. The inner end of the pivot pin 54 is attached in any suitable manner to a spring contact member 55, the latter being bent into U shape with one leg attached to the inner end of the pivot 54 and the opposite leg 56 being resiliently biased and pressed against the center contact of the incandescent lamp 49. An electric current wire 57 has one end electrically attached to the spring contact member 55 and in the embodiment shown the end of the wire 57 and one leg of the spring contact member 55 are secured to the inner end of the pin 54 flat against each other and the inner surface of the plug nut 53.

The wire 57 extends into a socket formed in the journaled end of one side of the member 37 and containing an insulating sleeve 58. The wire 57 is connected with the terminal 57' mounted in the sleeve 58. A metallic sleeve 59 is disposed in the upper part of the insulating sleeve 58 and in this sleeve a sliding brush or contact 60 is mounted for making contact with the trunnion pin 36 and a spring 61 is disposed between the terminal 57' of the wire and the sliding contact 60 to cause the contact 60 to bear upon the periphery of the pin 36. The latter is housed in an insulating sleeve 62 and the insulating sleeve 62 is provided with a longitudinal slot 63 on one side thereby permitting the contact member 60 to make contact with the pivot pin 36 when the bail member is in its downward position. The contact of the incandescent lamp however is automatically broken the moment the light bracket is moved from its downward position since the contact 60 then rides upon the insulating sleeve 62.

The trunnion pin 36 and its sleeve 62 are held against rotary movement by means of an insulating sleeve 65 passing through an opening in a support 35 from the interior of the casing 12 and extending into a recess formed in the upper part of a trunnion pin 36. A wire 66 disposed within the casing is connected with the pin 36 to complete the circuit to the electric lamp when the bail member 37 is in its downward position. This electric wire 66 passes down through the insulating sleeve 65 and the end thereof is electrically connected with one wall of the recess 67 formed in the pin 36, a screw 68 being screw-threadedly mounted in a threaded opening formed in the end of pin 36 and engaging the terminal of the wire 66 as indicated at 67' and pressing it in contact with the pin.

The casing containing the diaphragm is provided with a battery casing 70 on one side thereof with the battery casing being disposed in parallel relation with the trunnion pin 36. One end of the battery casing 70 is provided with a battery cover 71 and batteries 72 are mounted inside the battery casing. One end of the casing is provided with a metallic screw 73 which extends into the casing and is provided with a metallic contact 74. The metallic screw 73 and the contact pin 74 are insulated from the casing by means of an inner insulating disc 75, an outer insulating disc 76 and by the insulating sleeve 77. The electric wire 66 is connected with the contact 74. A spring 78 at the opposite end of battery casing functions to press the batteries into contact with each other and with the central contact 73, 74 and at the same time makes electrical connection with the central contact of the adjacent battery, thereby grounding the latter to the cover 71.

The casing 12 is provided with a fixed scale 80, the scale 80 being attached in any suitable manner to the periphery of the casing as by screws 81 and located on the opposite side from the battery casing 70. This scale is preferably of metal which is fastened to the periphery by the screws 81. The movable scale or index is shown at 85 and it is mounted in vertical position to traverse the fixed scale. The base for this movable scale or index 85 is formed of a metallic strip, the outer portion of which carries the scale 85. This strip is formed with several right angle bends to form a vertical elongated frame portion 86 for the movable index with the two ends of the strip being brought together to form an attaching means 87. The scale frame is mounted on the diaphragm adjusting ring 26, the fastening means or tongue 87 being illustrated as fastened to the upper side of the ring 26 near the periphery thereof by means of screws 88. The mounting and arrangement are such that the portion 86 of the movable scale frame surrounds and traverses that portion or substantially all that portion of the cylindrical surface of the casing 12 carrying the fixed scale 80. The cylindrical arcuate portion of the cylinder 12 is indicated at 89 and the upper and lower surfaces of the cylindrical casing 12 are provided with slots 90 and 91 respectively to permit the movable scale frame portion 86 to freely traverse the scale 80 as the aperture adjusting ring 26 is moved.

The scales, except for differences in structure and different mountings do not differ substantially from those shown in the aforesaid patent. The curves of the fixed scale are omitted but the points of the curves are included as indicated by the numbers appearing on the fixed scale. The curves through like numbers would approximate the curves of the scales of the patent. The scale is a substantial improvement over that of the issued patent, however, in that it may be used with equal facility for various sized films as, for example, 5 x 7, 8 x 10, 10 x 12, 11 x 14, 7 x 17 and 14 x 17. The extreme vertical left-hand end scale, namely, 5, 8, 10, 11, 7 and 14 corresponds to the first dimensions of standard films to be used. I have also included a vertical scale marked 9, 13, 16, 18, 19 and 22 to indicate the different diameters sufficient to fully expose the corresponding film. The vertical scale 22, 30, 36, 40, 48, 60, 72 and 84 indicates the distance from the target to the film. The Roman numerals of the scale indicate diameters only and have nothing to do with the film sizes themselves. The balance of the numbers corresponds to the numbers to the far left of the vertical. One example of the use of the scale is as follows.

Assuming a target film distance of 30 inches and the use of an 8 x 10 film, full exposure is had if the sliding scale is moved to bring the figure "30" in coincidence with the number "8" on the fixed scale on the line with the 30 mark. If it is desired, for example, to secure the 11-inch diameter at the same target-to-film distance the moving scale is then moved to the Roman numeral XI for the same size film, that is the Roman numeral XI on the line with the 30-inch distance mark.

The points on the fixed scale may be determined in any suitable manner as, for example, empirically by any well known method. The scale when once made may be used for any conventional X-ray machine, assuming the distance from target to the diaphragm to be the same. In most X-ray apparatus now in use the distance from target to the supporting cross arms is around 5 to 6 inches. If it is desired to use the same scale on different machines, it is only necessary to calibrate the scale for a somewhat greater distance from the target to the top of the housing 12, etc. The adapter 12' may be of any suitable height and for different depths the scale should be calibrated according to the dimensions of the machine on which it is to be used.

The centering of the exposure exactly as required may be easily effected by the structure and mechanism above set forth. When one is ready to center the exposure it is only necessary to exert sufficient pressure on the swingable light frame 37 to disengage the ball and detent lock 39 and 40 which normally retains the frame in the horizontal or full-line position of Fig. 1. If the weight of the light frame 37 is not sufficient in itself to swing down to the vertical position shown in dotted lines in Fig. 1 it may manually be moved to that position and in that position it is also locked by the ball 40 engaging the recess 39 in the other insert 38 which holds the frame and the tube 45 in exact alinement. In this position the lamp 49 is lighted by the mere act of moving the frame down to the vertical position. The circuit of the lamp is completed through the conductor 66, the contact 67' in the trunnion pin 30, the ball or brush 36, the spring 61, the connector 57', the conductor 57, the contact spring 55, a center contact of the base of the lamp 49 and the ground connection formed by the collar 49'. With the lamp 49 and the lens 51 projecting a spot of light upon the subject to be photographed or upon the film 30 the exact centering may be effected for exposure. This may be effected with marked facility. After the centering takes place it is only necessary to snap the light frame 37 out of the locked position and move it up to the horizontal position shown in full lines in Fig. 1 whereupon the exposure may be made with the assurance that the exact part of the subject is exposed and centrally of the exposed area.

The structure and mounting of the scales are characterized by marked simplicity and economy in manufacture and in addition the scales are of a character as above indicated to obtain the exact area of exposure desired with any standard film.

The diaphragm elements 14 are mounted for adjustment between the annular gear member 26 and an annular metallic member 101, these members 26 and 101 being of any suitable metal as, for example, steel. The ring 101 is supported by an annular ring 100 of lead. The diaphragm elements 14 are formed of lead preferably having their surfaces or faces formed of steel or the like.

While I have shown a conventional iris diaphragm for controlling the exposure aperture, it is understood that any other suitable control for the aperture may be employed. When a diaphragm or control having a rectangular or other non-circular aperture is used the scale is calibrated either empirically or geometrically to give the desired dimensions of the exposed area of the film for different openings of the diaphragm.

I claim:

1. An attachment for an X-ray machine comprising a casing having means therein for controlling the exposure aperture, a bracket trunnioned to one side of the casing about an axis disposed a right angles to the X-ray beam, said bracket being movable from a horizontal to a vertical position and carrying a light source centering means which is in alinement with the aperture and the target when in the vertical position, and control means for energizing said light source comprising a contact carried by the bracket in the vicinity of the trunnion, an insulating sleeve about said trunnion and an opening in said sleeve permitting the contact to engage the trunnion when the lamp is in the centering position.

2. An attachment for an X-ray machine comprising a casing and means therein for controlling the exposure aperture, said casing having bracket supports on the opposite sides thereof, a bail-like bracket pivoted in said bracket supports about an axis disposed at right angles to the X-ray beam, said bracket being adapted to occupy a position adjacent the casing and out of the path of the beam and a position at right angles thereto with the central portion of the bail-like bracket disposed in the beam path, said bracket carrying at the central portion thereof light source centering means which is in alinement with the aperture and the target of the machine when the bracket is in the latter position, means for releasably locking the bracket in either of its positions but readily movable therefrom by applying pressure to the bracket and control means for energizing said light source when in the centering position.

3. An attachment for an X-ray machine comprising a casing and means therein for controlling the exposure aperture, said casing having bracket supports on the opposite sides thereof, a bail-like bracket pivoted in said bracket supports about an axis disposed at right angles to the X-ray beam, said bracket being adapted to occupy a position adjacent the casing and out of the path of the beam and a position at right angles thereto with the central portion of the bail-like bracket disposed in the beam path, said bracket carrying at the central portion thereof light source centering means which is in alinement with the aperture and the target of the machine when the bracket is in the latter position, means for releasably locking the bracket in either of its positions but readily movable therefrom by applying pressure to the bracket and control means for energizing said light source when in the centering position, comprising a switch control incorporated in one of the pivots.

ARTHUR WRIGHT.

REFERENCES CITED

The following references are of record in the file of this patent:

UNITED STATES PATENTS

| Number | Name | Date |
| --- | --- | --- |
| 1,608,269 | Freund | Nov. 23, 1926 |
| 1,643,453 | Holst | Sept. 27, 1927 |
| 2,217,308 | Cox | Oct. 8, 1940 |
| 2,295,975 | Storm | Sept. 15, 1942 |